S. S. HOWELL.
SIGNAL DEVICE FOR AUTOMOBILES.
APPLICATION FILED OCT. 24, 1919.
1,347,274. Patented July 20, 1920.
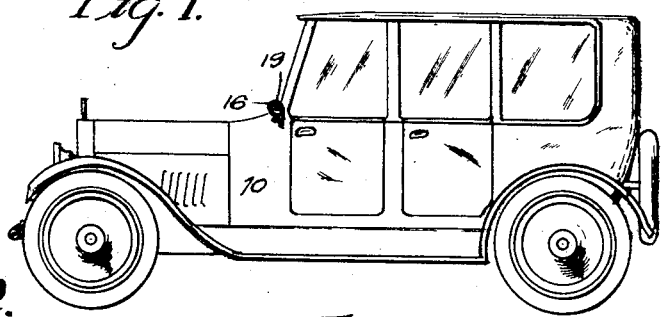
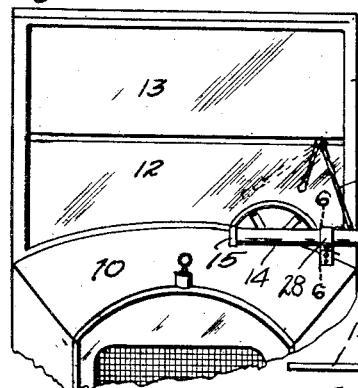
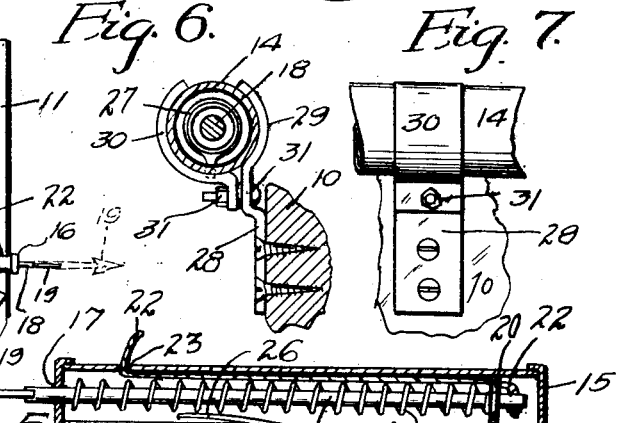
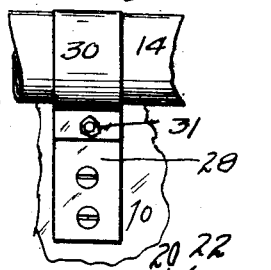
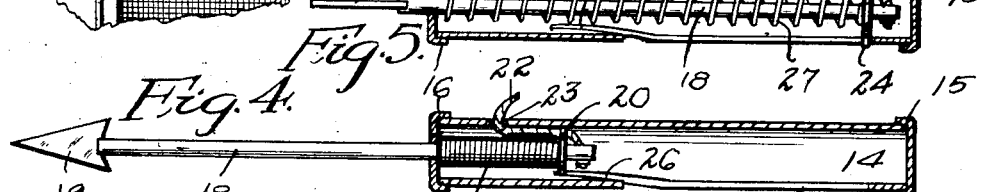
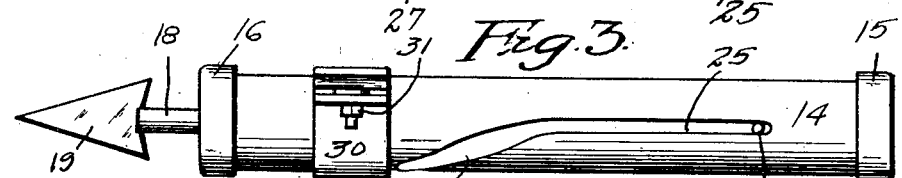
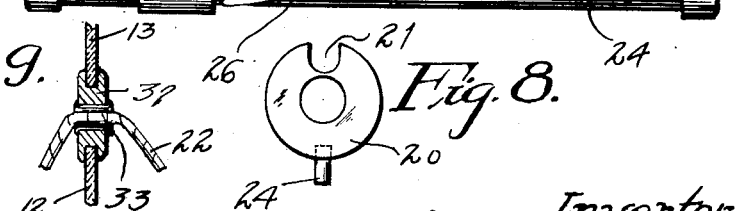

UNITED STATES PATENT OFFICE.

SQUIRE S. HOWELL, OF DES MOINES, IOWA.

SIGNAL DEVICE FOR AUTOMOBILES.

1,347,274.  Specification of Letters Patent.  Patented July 20, 1920.

Application filed October 24, 1919. Serial No. 333,070.

*To all whom it may concern:*

Be it known that I, SQUIRE S. HOWELL, a citizen of the United States, and a resident of Des Moines, in the county of Polk and State of Iowa, have invented a certain new and useful Signal Device for Automobiles, of which the following is a specification.

The object of my device is to provide a signal device for automobiles of simple, durable and inexpensive construction.

A further object is to provide a signal device, which may readily be fixed to a windshield of an automobile, and is capable of being operated by the operator of the car.

Still a further object is to provide a signal device especially adapted for use on a closed car commonly known as a sedan or coupé model. It will be noted that it is very difficult to signal from a closed car, the direction which the operator of the car wishes to go, and my device is believed to eliminate this difficulty.

Still a further object is to provide a device having an arrow head shaped member on it, which can be extended out from the side of the car, so that the operator of a car in the rear may readily note that the operator of the first car is about to turn or slow down, thus giving the car behind warning of what is about to happen.

Still a further object of my device is to provide an arrow shaped member, which will lie in a horizontal position when it is in inoperative position, and which will be moved to substantially a vertical position, when it is moved to operative position.

With these and other objects in view, my invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of a closed car with my device installed thereon.

Fig. 2 shows a front elevation of a position of a car with my device installed.

Fig. 3 shows a side elevation of my improved signal device with a clamping means attached thereto.

Fig. 4 shows a central, sectional view through my device with the arrow in operative position.

Fig. 5 shows a central, sectional view of the same, the arrow being shown in inoperative position.

Fig. 6 is a central, sectional view taken on the line 6—6 of Fig. 2.

Fig. 7 is a side elevation of the clamping device.

Fig. 8 is a detailed view of the collar forming part of my device; and

Fig. 9 is a central, sectional view through the guide, whereby the cord is taken from the outside of the car to the inside of the car.

In the accompanying drawings, I have used the reference numeral 10 to indicate an ordinary automobile preferably of the closed-in type. The automobile 10 is provided with an ordinary windshield 11, having a lower glass 12 and an upper glass 13.

My device comprises a tubular shaped casing member 14, which is provided with end closure members 15 and 16. The closure member 16 is provided with an opening 17 for permitting a rod 18 to pass therethrough. The rod 18 is provided at one end with an arrow-shaped member 19 and at the other end with a collar 20.

The collar 20 is provided with an opening 21. Fixed to the inner end of the rod 18 is a cord 22, which is adapted to extend through the opening 21 and out of the casing 14 at the opening 23. The collar 20 is fixed to the rod 18 and is provided with a pin 24.

The casing 14 is provided with a slot 25, which has a curved portion 26 formed in it near the forward end of the casing. The pin 24 on the collar 20 is designed to be received in the slot 25 of the casing 14.

Mounted on the rod 18 and between the closure member 16 and collar 20 is a coil spring 27 for yieldingly holding the signal device in inoperative position.

My device is attached to the automobile 10 by the clamp member 28. The clamp member 28 is preferably made of two halves 29 and 30 and is held in position by means of a bolt 31. By releasing the bolt 31, it will be seen that it is very easy to detach my signal device from the automobile. By using this form of clamping device, I am able to adjust my signal device to various makes and kinds of cars.

It will be noted that between practically all the upper and lower portions of a windshield, there is a slot or space between the two plates of glass. Between the two plates of glass, I provide a washer 32, preferably made of rubber, so that it may be forced into position. The washer 32 is provided with an eyelet 33 through which the cord 22 passes from the outside of the car to the inside within easy reach of the driver of the car, substantially as is shown in Fig. 2 of the drawings.

It will be seen that by pulling the cord 22 from the inside of the car, it will cause the rod 18 and arrow 19 to be forced outwardly against the action of the spring 27, and when the operator releases the cord 22, the spring 27 will return the arrow 19 and rod 18 to inoperative position.

In order to make my device more noticeable and capable of easily attracting the attention of anyone, I have provided means, so that the arrow 19 will be rotated substantially a quarter of a revolution, when it is being moved to operative position, as shown in Fig. 4 of the drawings.

Ordinarily when my device is in operative position, the arrow-shaped member 19 is in a horizontal plane, but when the device is being operated, the arrow-head will rotate until it is substantially in vertical position.

The collar 20 being fixed to the rod 18 and pin 24, which slides in the slot 25 and curved portion 26, being fixed to the collar 20 will cause the rod to rotate slightly when the pin 24 is pulled into the curved portion 26 of the slot 25.

I have so provided the curved portion 26 of the slot 25 that the pin 24 will not bind, but will work freely when the spring 27 is returning the arrow to its inoperative position.

It is very important that the device will return automatically to inoperative position without any action whatsoever on the part of the operator of the car.

In driving a car with my device attached thereto, it is a very easy matter to take hold of the inner end of the cord 22 and pull it, while you are slowing down, just before you turn a corner, and when you start to turn a corner, just let go of the cord and the spring 27 will then return the arrow to the inoperative position.

By making the arrow-head 19 rotate substantially a quarter of a revolution when it is moved to its operative position, will cause the device to become noticed and in this way attract attention of those interested in which way the car is going to turn.

It will be seen that in the accompanying drawings, I have attached my device on the lefthand side of the car, but it would be possible to attach two of such devices to the ordinary automobile, so that one would be on the righthand side and the other on the lefthand side, but ordinarily it is not necessary to notify the car behind that you are going to turn to the right, but it is necessary to notify the car behind when you expect to turn to the left. The righthand side of the car is always next to the curbing and thus no signal need be given when you are about to turn to the right.

Some changes may be made in the construction and arrangement of my signal device for automobiles without departing from the real spirit and purpose of my invention, and it is my intention to cover by my claim any modified forms of structure or use of mechanical equivalents, which may be reasonably included within their scope.

I claim as my invention:

In a signal device for automobiles or the like comprising a tubular shaped casing adapted to be fixed to an automobile windshield or the like, a removable cap having a central opening therein fixed to one end of said casing, a rod slidably mounted in said cap and partially received in said casing, a second cap removably fixed to the free end of said casing, said rod being provided with an indicating member on its end extended beyond the casing, a collar fixed to said rod on its inner end within said casing, said collar being substantially the same diameter as the interior of the casing, whereby the rod will be centered by the opening within said first cap and said collar, said casing having a curved slot formed in its side intermediate of its ends and extending substantially a quarter of the circumference of said casing, a pin formed on said collar and adapted to project through said slot, whereby the longitudinal movement of the rod will cause it to rotate substantially a quarter revolution whereby the indicating member will be moved from a horizontal position to substantially vertical position, a cord fixed to said collar and extended through the casing near its forward end, a spring around said rod and extended between the collar and said first cap, whereby the rod will be yieldingly held in its rear limit of movement, the parts being so arranged that when the cord is drawn the indicating member will be moved outwardly to display position against the action of the spring and when the cord is released, the rod will be returned to its rear limit of movement.

Des Moines, Iowa, October 18, 1919.

SQUIRE S. HOWELL.